F. SCHIMMEL.
SHOCK ABSORBER.
APPLICATION FILED JAN. 9, 1914.
1,114,651.
Patented Oct. 20, 1914.
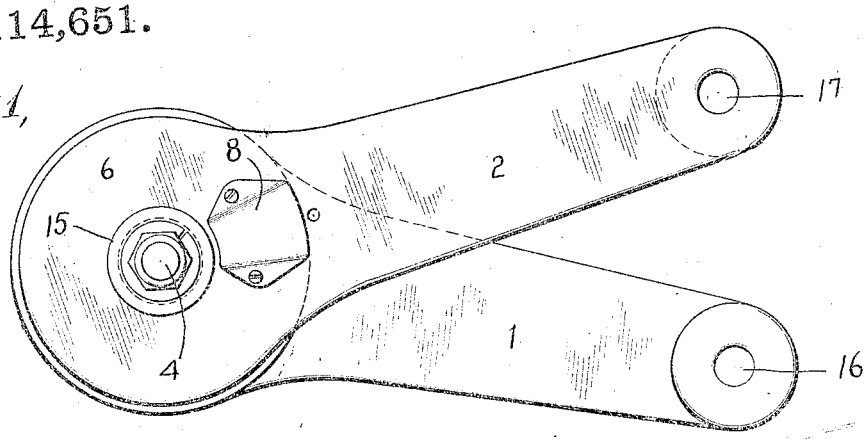
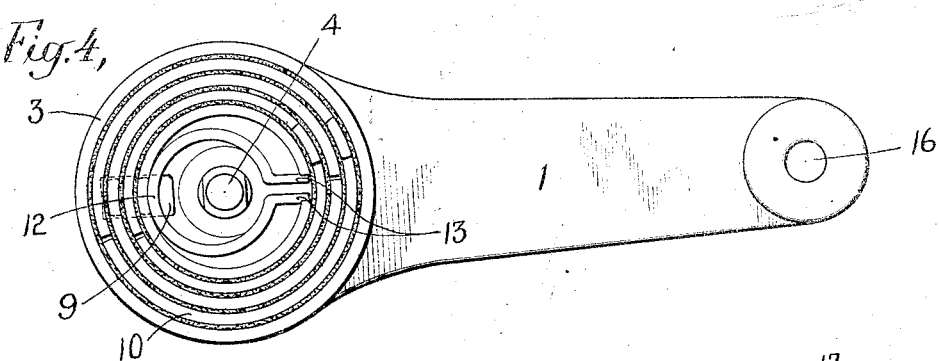
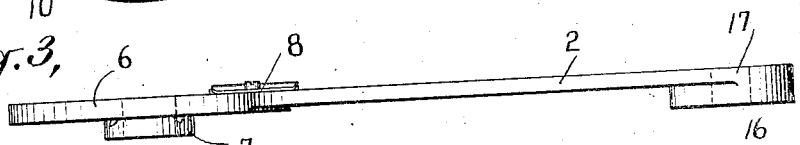
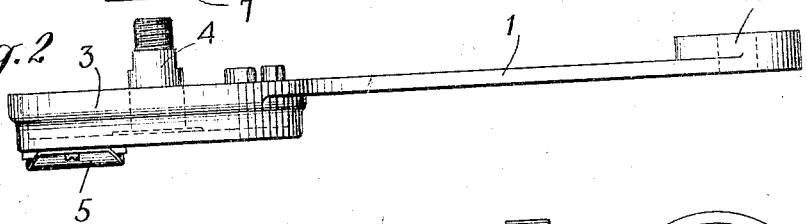
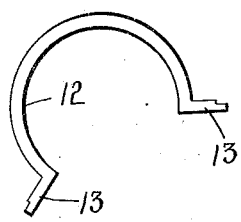
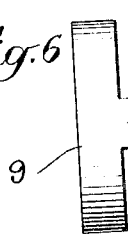
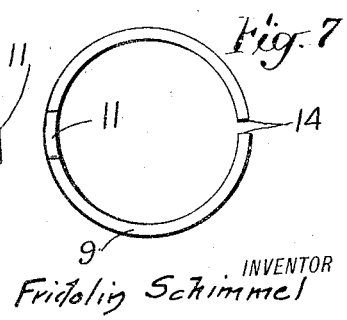
WITNESSES
Florence M. Aleer
S. Le Roy.
INVENTOR
Fridolin Schimmel
BY
Edw. L. Bankwirkl
ATTORNEYS

UNITED STATES PATENT OFFICE.

FRIDOLIN SCHIMMEL, OF FARIBAULT, MINNESOTA.

SHOCK-ABSORBER.

1,114,651.  Specification of Letters Patent.  Patented Oct. 20, 1914.

Application filed January 9, 1914. Serial No. 811,206.

*To all whom it may concern:*

Be it known that I, FRIDOLIN SCHIMMEL, of Faribault, Rice county, in the State of Minnesota, have invented certain new and useful Improvements in Shock-Absorbers, of which the following is a specification, reference being made to the accompanying drawing, forming a part hereof.

The improvements are concerned more particularly with frictional shock absorbers so constructed that the friction between the rotating members will be graduated in amount as the arms of the shock absorber are moved in either direction away from their normal position; the object of such a device being to retard the movement of the spring system of an automobile or the like but little when the vehicle is traveling over relatively smooth roads and to proportionately increase the retarding effect when traveling over rutty roads.

The present invention relates to improvements in that type of shock absorber and consists of an improved construction whereby several advantages are secured which will be more particularly set forth hereafter.

In the accompanying drawings Figure 1 is an assembled view of a device embodying the invention. Fig. 2 is an elevation of one of the arms. Fig. 3 is a similar elevation of the other arm. Fig. 4 is a plan of the arm shown in Fig. 2. Fig. 5 shows the spring 12 provided for radially extending the concentric rings. Figs. 6 and 7 show the concentric rings.

The shock absorber includes as usual two arms, 1 and 2. The arm 1 is formed with an annulus 3 which is provided with a central pin 4 and a tapered recess 5. The arm 2 is provided with an enlarged face 6, which serves as a cap for the annulus 3. This arm is also provided with a central lug or projection 7 adapted to engage the pin and a tapered recess 8. Housed in the annulus 3 I provide a plurality of spring rings 9. Interposed between these spring rings may be rings of special fabric construction, brake lining, or similar material 10. Each of the spring rings 9 is provided with lips or lugs 11 which extend out from the surface of the rings so as to engage the tapered recesses 5 and 8 of the two arms 1 and 2. In order to increase the friction between the rings I provide a spring member 12 with ends 13 adapted to go in between the ends 14 of the interior concentric ring, thus spreading the concentric spring rings with a greater radial force. These concentric spring rings are inserted in the housing so that every other ring has its projection 11 on the same side adapted to be engaged by the tapered recesses 5 and 8. It will be readily understood therefore that when the elbow is moved these adjacent concentric rings moving in opposite directions will retard the movement. The object of the tapered recess is to bring these adjacent rings into motion step by step. When the smallest portion of the tapered recess engages one of the lugs, it moves its ring before the gradually wider portion of the taper comes in contact with the lug of the next radial ring. By this method the various concentric rings are moved one at a time with increasingly frictional area brought into play. The two arms are secured by the usual washers and nuts 15.

In attaching the shock absorber to a vehicle the ends 16 and 17 of the arms 1 and 2 are connected up in the usual manner. As will be readily understood, there will be no fixed neutral point which requires the design to be changed for every type of vehicle and for every load. This shock absorber adjusts itself for every varying condition. Finally it will be observed that the present improvement provides an exceedingly simple construction for the embodiment of the type of shock absorber here in question.

I claim—

1. In a shock absorber of the class described, a friction joint comprising a number of rings of frictional material interposed between radially expanding concentric rings arranged so that friction is obtained on both sides of the friction rings and spring rings.

2. In a shock absorber of the class described a friction joint comprising a number of friction rings interposed between spring rings coaxially housed so that frictional contact is had on both sides between the friction rings and spring rings.

3. In a shock absorber of the class described a friction joint comprising a number of friction rings interposed between spring rings arranged so that friction is obtained on both sides of the friction rings and spring rings, means to move the rings coaxially in opposite directions.

4. In a shock absorber of the class described having two arms which are jointed together to form an elbow, a friction joint comprising a number of friction rings interposed between spring members arranged so that friction is obtained on both sides of the friction rings and spring rings, means to move the rings by the opening or closing of the elbow.

5. In a shock absorber having two arms which are jointed together to form an elbow, the combination of a plurality of spring rings housed concentric with the joint, friction rings interposed between the spring rings and means to increase the expansion of the spring rings to coact with the friction rings on both sides.

6. In a shock absorber having two attaching arms jointed to form an elbow, one of the arms being formed with an annulus at the jointed end adapted to receive a plurality of concentric rings, a plurality of spring rings interposed between rings, the other arm formed at one end to cap over the annulus forming a housing for the joint, means to expand the spring rings against the friction rings, means for coaxially moving the adjacent spring rings in opposite direction.

7. In a shock absorber having two attaching arms jointed to form an elbow, one of the arms being formed with an annulus at the jointed end and adapted to receive a plurality of concentric rings, the other arm formed to cap over the annulus providing a housing for the joint, means to expand the rings radially, means connected with the arms to move the adjacent concentric rings coaxially in opposite directions.

8. In a shock absorber having two attaching arms jointed to form an elbow, a plurality of concentric spring rings, means to move the concentric spring rings separately and in opposite directions coaxially.

In testimony whereof, I have signed my name to this specification, in the presence of two subscribing witnesses.

FRIDOLIN SCHIMMEL.

Witnesses:
 J. W. LE CRONE,
 ROBERT MEE.